Aug. 18, 1970 — R. H. SPRY — 3,524,308
DETASSELING APPARATUS
Filed July 18, 1967 — 4 Sheets-Sheet 1

Inventor
Robert H. Spry
By Hume, Clement, Hume & Lee
Attorneys

Aug. 18, 1970   R. H. SPRY   3,524,308
DETASSELING APPARATUS
Filed July 18, 1967   4 Sheets-Sheet 2

Inventor
Robert H. Spry
By Hume, Clement, Hume & Lee
Attorneys

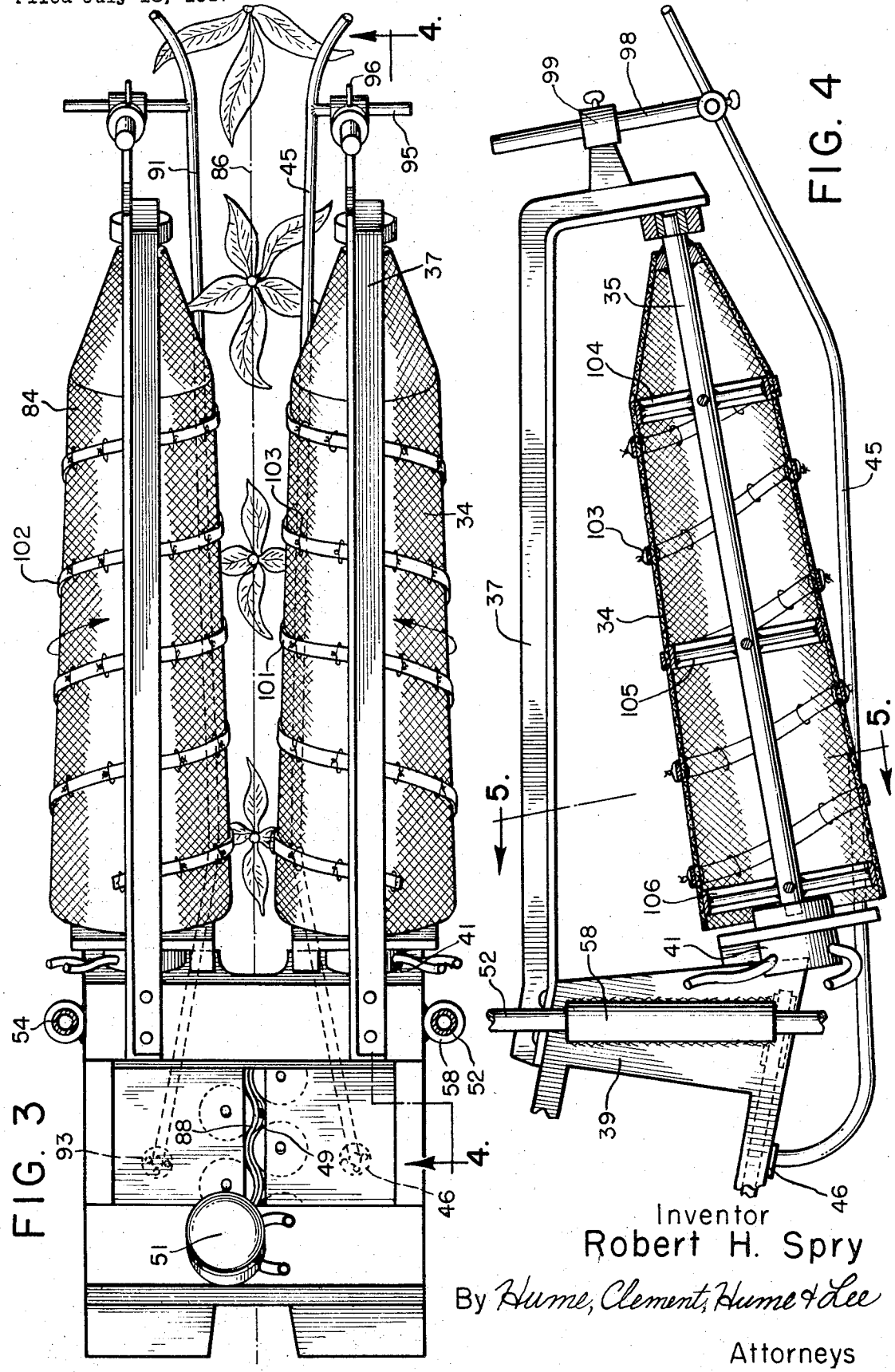

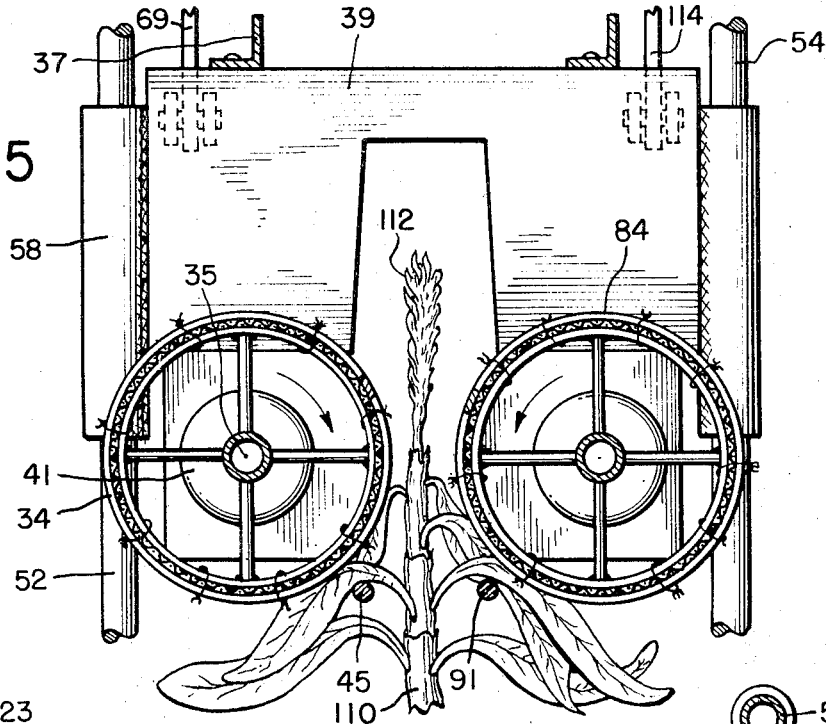
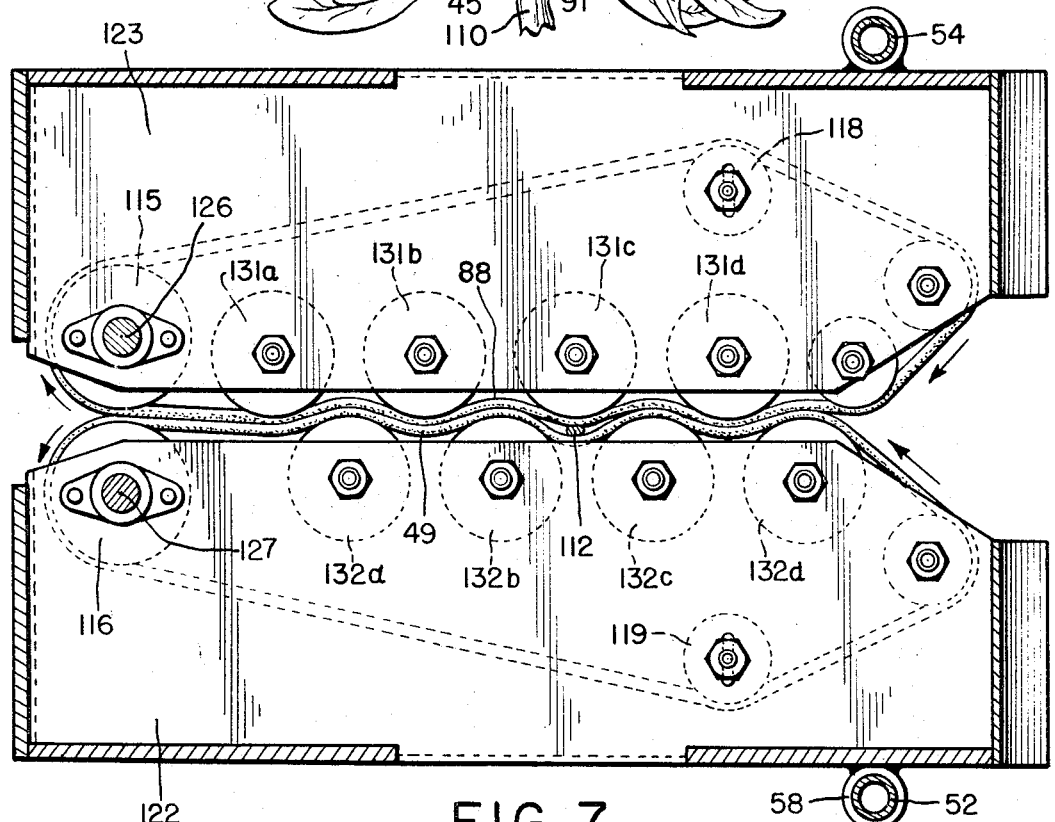

United States Patent Office 3,524,308
Patented Aug. 18, 1970

3,524,308
DETASSELING APPARATUS
Robert H. Spry, 21 Sunset Road,
Bloomington, Ill., 61701
Filed July 18, 1967, Ser. No. 654,133
Int. Cl. A01d 45/02
U.S. Cl. 56—51
12 Claims

ABSTRACT OF THE DISCLOSURE

Apparatus for severing the tassels from the female parent plant in hybrid seed corn crossing fields is disclosed. The apparatus is mounted on a support carriage for movement along rows of the corn plants and a pair of elongated drums, oriented on opposite sides of a row of corn plants, are rotated to move their adjacent surfaces downwardly to non-destructively depress the leaves of the corn plant about the tassel and expose the root of the corn tassel. A severing device, positioned rearwardly of the leaf depressor unit and having a pair of flexible drive belts, with contiguous surface portions including upwardly from a forward point, receives the tassels from between the depressed leaves and lifts the tassels away from the corn plant to sever them therefrom.

INTRODUCTION

The present invention relates generally to mechanical apparatus for selectively removing a portion of a growing plant. The invention is of particular utility in removing tassels from corn plants in hybrid crossing fields and, accordingly, will be described in that context, although the more general utility of the invention will be understood.

In the growing of hybrid seed corn it is necessary that one type of corn plant be cross-fertilized from a plant of a different type. Since corn plants are asexual, that is, an individual plant carries both the male and the female reproduction organs in the form of respectively the corn tassel and the corn silk, it is necessary to inhibit the natural self-fertilization process. This is accomplished by growing corn plants of one type in rows interspersed with rows of corn plants of a second type and removing the tassels from all of the corn plants of one type so that the silk of the detasseled plants are fertilized only by pollen from corn plants of the second type.

In the prior art, tassels have been removed from corn plants most commonly by a manual operation. Such mechanical apparatus as is known to the art is unsatisfactory in that it either does not completely and reliably sever the tassels and/or does so in a manner which materially injures the plant.

SUMMARY OF THE INVENTION

It is therefore an object of the present invention to provide new and improved mechanical apparatus for efficiently severing tassels from corn plants or the like which apparatus overcomes the aforenoted disadvantages of the prior art.

It is a further object of the present invention to provide such apparatus in which the operational parameters are adjustable to accommodate the peculiar characteristics of various species of corn and the variable growing heights thereof to the end that the tassels are conveniently and reliably severed from the plants with minimal injury thereto.

It is another object of the present invention to provide apparatus for non-destructively depressing the leaves of the corn plant about the tassel to expose the root or base thereof to a severing device.

It is still another object of the invention to provide an improved device for severing tassels of corn plants.

In accordance with the present invention, apparatus for removing tassels from corn plants or the like is adapted for mounting on a support carriage for movement along rows of corn plants. The apparatus comprises means for non-destructively depressing the leaves of the corn plant about the tassel for exposing the root of the tassel. Additional means, positioned rearwardly of the leaf depressing means, are provided for severing the tassels from between the depressed leaves. Preferred forms of the leaf depressing mechanism and the severing device are useful independently of each other. However, these elements are particularly well-mated and it is preferred that they be used as an integral unit.

BRIEF DESCRIPTION OF THE DRAWINGS

The features of the present invention which are believed to be novel are set forth with particularity in the appended claims. The invention together with further objects and advantages thereof may best be understood, however, with reference to the following description taken in connection with the accompanying drawings in the several figures of which like reference numerals identify like elements and in which:

FIG. 3 is a view taken along line 3—3 of FIG. 1 and particularly illustrates the leaf depressor apparatus of the present invention;

FIG. 4 is a side elevational view, partly in section, of the leaf depressor apparatus which is taken along line 4—4 of FIG. 3;

FIG. 5 is a sectional view of the leaf depressor apparatus taken along line 5—5 of FIG. 4;

FIG. 7 is a plan view of the severing device taken along line 7—7 of FIG. 6.

DESCRIPTION OF THE PREFERRED EMBODIMENTS

Figure 1:
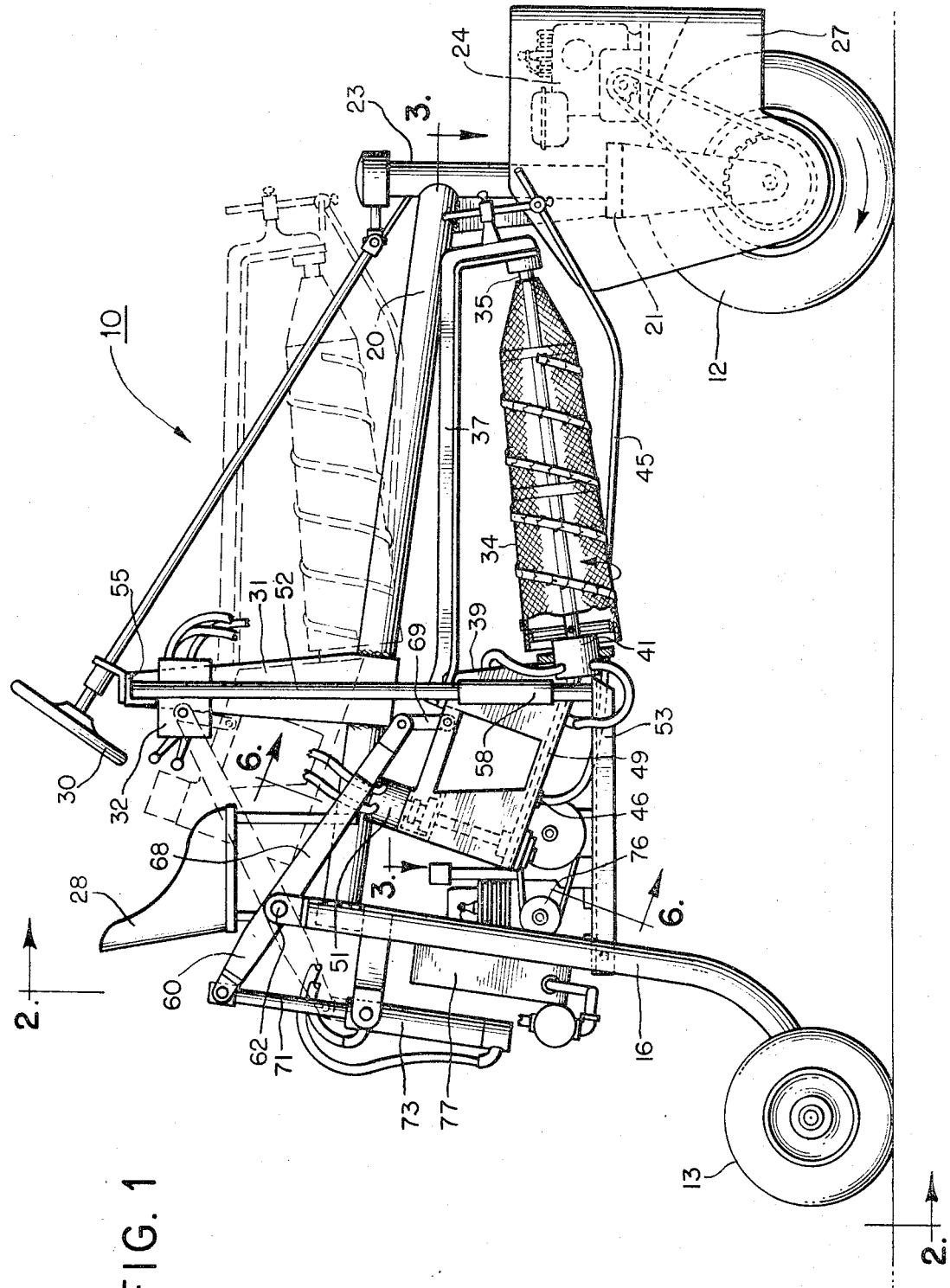
FIG. 1 is a side elevational view of a vehicle embodying a pair of corn detasseler units of the present invention.
Figure 2:
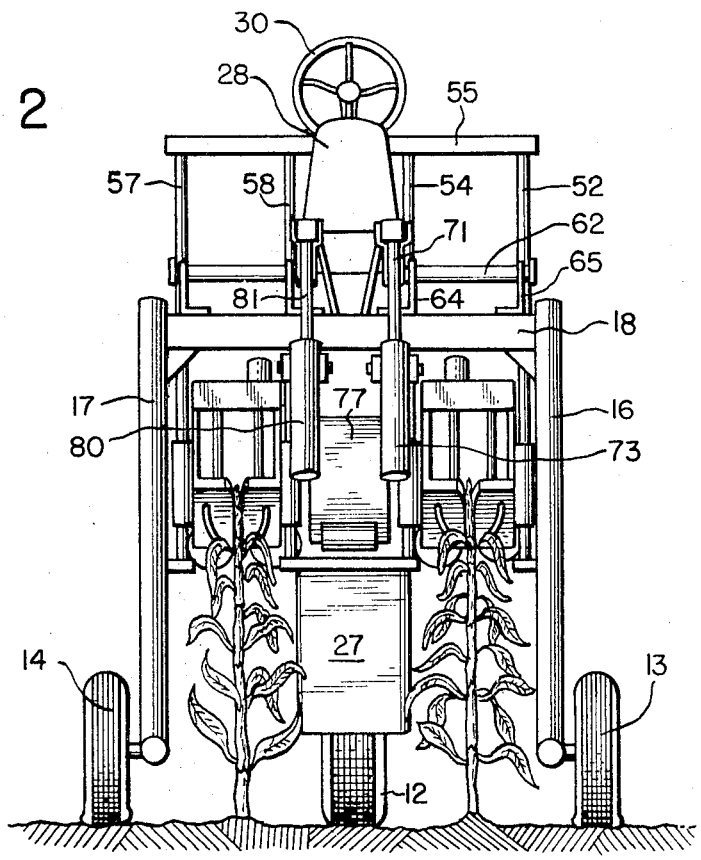
FIG. 2 is a rear elevational view taken along line 2—2 of FIG. 1.

Referring to FIGS. 1 and 2, there is illustrated a vehicle 10 which carries a pair of corn detasseling units of the present invention. The vehicle 10 is of the tricycle type and includes a single front tire 12 positioned intermediately of a pair of spaced back tires 13 and 14. The back tires 13 and 14 are individually connected by conventional axle mechanisms to vertically directed tubular frame members 16 and 17, respectively which members constitute a portion of the support carriage of the vehicle 10. The frame members 16 and 17 are connected by a crossbar 18, the mid-portion of which is connected to a further tubular frame member 20 which extends toward the front portion of the vehicle.

The enlarged front tire 12 is supported by an axle which extends between opposite legs of a drive fork 21, shown in phantom outline in FIG. 1. The fork and the frame member 20 are interconnected to complete the vehicle carriage by a hollow vertical post 23. The drive engine 24 for the carriage is mounted adjacent the front wheel 12 and is driveably connected thereto in conventional fashion. A U-shaped skirt member 27 protectively encloses the motor and drive mechanism.

The vehicle 10 further includes an operator's seat 28 positioned above crossbar 18 and the frame member 20 by a plurality of rigid support rods. The seat 28 is, of course, positioned adjacent a steering wheel 30. A conventional steering column and drive mechanism is held in a bearing positioned atop a post 31, the post being rigidly fixed at its lower end to the tubular frame member 20. The steering mechanism is coupled in conventional fashion to provide full steering therefor. A control box 32 is also conveniently located on the post 31 to afford the operator full control over the vehicle as well as individual control of the two detasseling units carried thereon.

Each detasseling unit of the present invention includes a leaf depressor means comprising a pair of drum-like members. All of the drums of each unit are identical and are exemplified by the drum-like member 34 which is supported for rotation about a central axle 35. The forward end of axle 35 is journaled in a bearing at one end of an elongated L-shaped support arm 37, the opposite end of arm 37 being fastened to the top of a metal support box 39 which carries the severing means, as will presently be explained. The axle 35 of drum 34 is driven in a counterclockwise direction, as indicated by the arrow in the drawing, from a hydraulic motor 41, the driving speed of which is adjustable by the operator from control box 32.

The leaf-depressor drum associated with the drum 34 is located directly behind this element as it is viewed in FIG. 1; accordingly, the second drum is not visible in this figure. The adjacent surfaces of these two drums are spaced sufficiently so as to accept the corn plants therebetween and the drums are rotated such that their adjacent sides move downwardly into engagement with the leaves of the corn plants therebetween.

This first set of leaf depressor drums is laterally centered between rear tire 13 and the center tire 12. The pair of drums for the second leaf depressor unit is positioned laterally between the rear time 14 and center tire 12.

Each depressor drums is provided with an associated guide arm which cooperates with the guide arm of an adjacent drum to prepare the corn stalks for entrance between each pair of depressor drums in an upright condition. Specifically, the drum 34 is provided with a guide arm 45 which is fastened rearwardly of the drum in a socket 46 on the lower surface of the metal box 39. The forward end of the guide arm 45 flares upwardly and outwardly away from drum 34 and is held in a pre-set vertical and lateral position from arm 37 by adjustment apparatus to be described in detail later herein.

Rearwardly of each set of depressor drums and supported within the box 39, there are provided means for severing the corn tassels from between the depressed leaves of the plant. This apparatus, of which only a portion is visible in phantom outline behind the side wall of box 39 in FIG. 1, comprises two flexible belts which are contiguous along portions of their respective lengths. The line defined by the contiguous belt portions lies along a center line between each pair of associated leaf depressor drums such that the corn plants are directly fed from the depressor to the severing means.

From the outline of one of the belts 49, it may be appreciated that the belts of the severing means incline upwardly from their forward to their backward end, preferably at an angle of about twenty degrees. The belt 49 and its associated belt (not shown) are driven at a like rotational speed by a hydraulic motor 51, the speed of which is adjustable from control box 32. Similar tassel severing means, as well as support and drive apparatus therefor, are provided for the remaining set of depressor drums which are laterally situated between the tires 12 and 14.

The support box 39 for the severing means is rigidly affixed to the support apparatus for the leaf depressor drum 34 at, for example, the rearward end of support arm 37. Each set of depressor drums and an associated severing means preferably form an integral unit which may be raised and lowered without altering the relative orientation of the components to thereby readily accommodate fields of corn of differing heights.

The raising and lowering mechanism for each detasseling unit comprises a pair of vertical guide tubes one of which 52 is visible in FIG. 1. The guide tube 52 is affixed at its lower end to an arm 53 which extends forwardly from the frame member 16. A second guide tube 54 (FIG. 2) and the guide tube 52 are joined along their respective top portions by an L-shaped crosspiece 55. The crosspiece 55 also extends as an integral tie piece between a second pair of guide tubes 57 and 58 which form a portion of the lifting mechanism for the second detasseling unit, again not fully visible in this figure. A collar 58, affixed to metal box 39, rides along the guide tube 52; a similar guide collar, not visible in FIG. 1, is affixed to the opposite side of frame member 39 and rides on the guide tube 54. Together the guide collars and guide tubes permit each detasseling unit to be raised and lowered between extreme positions adjacent the top and bottom of the guide tubes.

The actual lifting mechanism for the detasseling unit comprises a drive arm 60 which is rigidly affixed to a shaft 62. The shaft 62, as seen in FIG. 2, is journaled in a pair of spaced L-brackets 64 and 65 for rotational movement therein. A pair of elongated lifting arms, only one of which 68 is visible in FIG. 1, are affixed to opposite ends of the shaft 62 and extend downwardly in the direction of the detasseling unit. The illustrative arm 68 is connected to box 39 by a freely pivoting connector link 69.

The lifting arm 68 is actuated to raise the detasseling unit vertically along the guide tubes by a piston stem 71 which is pivotally connected to drive arm 60 at one end and which is connected at its opposite end to a piston positioned within the hydraulic cylinder 73. The cylinder 73 is powered to lift the detasseler unit to any selected position between the solid and dotted line positions illustrated in FIG. 1 by a motor and compressor unit 76 which is mounted on a support platform beneath the operator's chair 28. A hydraulic fluid reservoir 77 is positioned immediately behind the compressor unit; the tubular connections between the hydraulic power unit and the various hydraulic motors and control apparatus has been omitted from the drawings for the sake of clarity.

The second detasseler unit carried by the vehicle 10 is likewise raised and lowered along its associated guide tubes 57 and 58 by similar actuating apparatus which includes a hydraulic cylinder 80 and an associated piston stem 81. The hydraulic cylinder 80 is operated from the control box 32 independently of the first hydraulic lifting cylinder 73.

Referring now to FIG. 3, the relative orientation of the depressor drum 34 and its associated depressor drum 84 can now be fully appreciated. As shown, the drums 34 and 84 are mounted for relative positioning on opposite sides of a row of corn plants which plants are shown to lie along a center line 86 between the respective drums. If desired, the relative spacing between the drums of each detasseler unit may be made adjustable, for example, in a range from two to twelve inches, to permit the apparatus to be readily accommodated to a variety of plant species and environmental conditions.

The flexible drive belt 49 and an associated belt 89 of the severing means have their contiguous surface portions aligned along the center axis 86 so that the tassels are directly fed into positions between the belts 88 and 89. These belts rotate in respective, opposite directions to firmly grasp and draw the corn tassels from the forward to the rearward portion of the severing mechanism.

The drum 84 is, as previously stated, provided with an associated guide arm 91 which is fixed at its rearward end in a socket 93, located on the underside of the box 39. As indicated in phantom outline in the drawing, the guide arms 91 and 45 each initially project inwardly toward the center line 86 and from there run toward the forward end of the depressor apparatus along lines which taper gradually outwardly in approximate alignment with the tapered contour of the drums 34 and 84. The forwardmost portions of the guide arms then taper upwardly and outwardly along sharp arcuate contours to assure that plants even materially off the center line 86 are guided between the depressor drums.

The guide arm 45 is also provided with a transverse segment 95 which permits lateral adjustment of the arm by a holding collar and thumb screw arrangement 96. As seen most clearly in FIG. 4, a second stub segment 98 extends upwardly from the collar 96 through a second collar 99 which is affixed to the support arm 37 and is provided with a thumb screw for adjustably setting the vertical height of the guide arm 45. The guide arm 91 is provided with similar lateral and vertical adjustment apparatus.

The leaf depressor drums 34 and 84 are illustrated as being of an identical construction and such is preferred to assure suitable cooperation of the drums in performing their intended function. The drums each have a sharply conically tapered nose portion followed by a main body portion which is of a more gradual conical taper with the drums being of a larger diameter at their rearward ends. Thus, the spacing of the drums from the center line 86 is progressively decreased from the forward to the rearward end of the depressor apparatus. It has been found that such a gradual conical taper is often desirable to effect a progressive peeling of the leaves of the corn plant away from the tassel and to effect a progressively more stringent alignment of the plants with the severing mechanism which follows. However, it has also been found that under certain conditions cylindrical drums perform with equal effectiveness.

It has further been found that, for best operation, both drums of a leaf depressor unit should be provided with a roughened surface to promote friction between the drums and the leaves and thereby assure that the leaves are effectively and reliably depressed away from the tassel prior to movement of the corn plant into the vicinity of the severing mechanism. Wrapping of a one-quarter square inch mesh about a suitable support frame has been found to provide excellent results in practice. A further structural addition which has been found to be of material aid under certain conditions is the provision of helically wound metal bands 101 and 102 about drums 34 and 84, respectively. These bands are wound from the forward to the rearward end of each drum with a handiness such as to create an auger-like motion to the corn plants from the forward to the rearward end of the depressor apparatus upon proper rotation of the drums. One embodiment used in actual practice was constructed with a ⅛ inch by ½ inch cold rolled steel band curved in a compression spring style to follow the contour of the drum from its forward to its rearward end. The pitch of the helically wound bands for best operation is empirically determined according to the field conditions, the speed of the driving motor, etc.

The helical band is fastened to the wire mesh at spaced intervals by wire strands such as 103 which may be wound together, as illustrated, to form sharp spines which puncture the plant leaves and further assist in driving the leaves downwardly and away from the tassel. In this regard, it should be understood that puncturing or slight tearing of the leaves along their longitudinal dimension does not cause material injury to them, however, care must be taken to see that the leaves are not torn transversely to their length as such will cause serious injury.

The manner in which the wire mesh of the depressor drum 34 is supported may be most clearly understood by reference to FIG. 4. A series of annular metal rings 104, 105 and 106 are located at spaced intervals along axle 35. Each ring is supported by four radial spokes (FIG. 5) which are disposed about the axle at equal intervals. In one constructed embodiment, the rings 104, 105 and 106 were approximately ten, eleven and twelve inches in diameter respectively. The wire mesh is merely wrapped about the support rings and is tack welded along its longitudinal seam.

The axle 35 inclines downwardly from its forward to its rearward end at preferred angle of approximately 10° with the horizontal. This, of course, provides a similar inclination for the drum and such inclination has again been found preferable to assist in a progressive peeling of the leaves downwardly and away from the tassel.

The operation of the leaf depressor apparatus can best be appreciated by reference to FIG. 5. In this figure there is shown a corn plant 110 which is passing between the rotating leaf depressor drums 34 and 84. The drums 34 and 84 rotate respectively in a clockwise and a counterclockwise direction, as indicated by the arrows in the figure, so that the adjacent portions of these drums rotate downwardly along the axis of the stalk 110. The guide bars 45 and 91 retain the stalk 110 in a central position between the drums so that the drums are able to effectively depress the leaves on each side of an upstanding tassel portion 112.

In this figure, there is also visible a portion of the height adjustment apparatus which includes the lifting link 69 and a similar link 114 which are actuated to lift the entire detasseling unit along the guide tubes 52 and 54.

Figure 6:
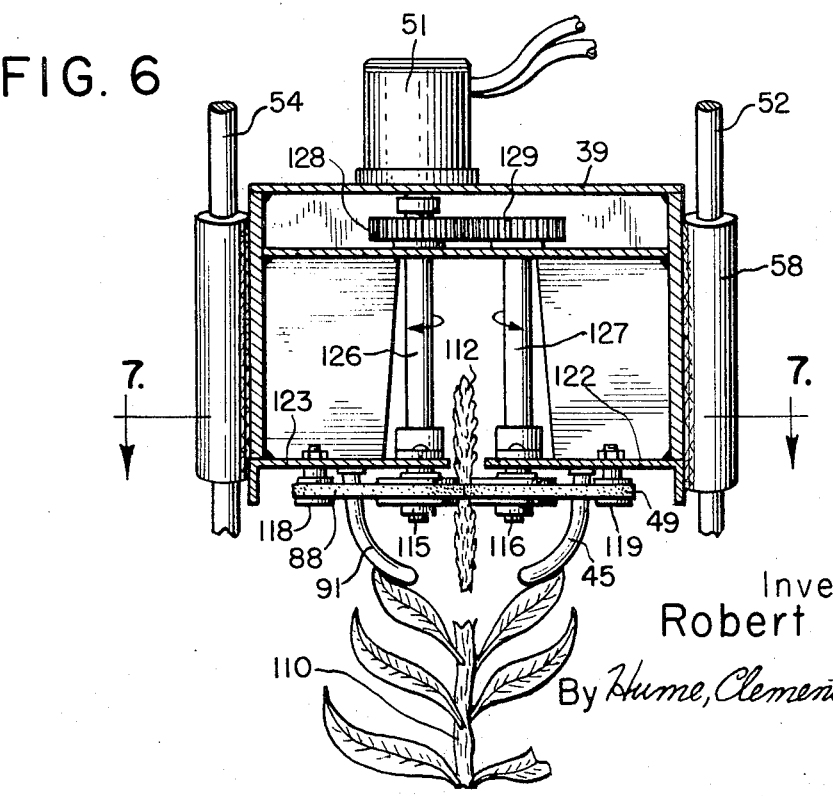
FIG. 6 is a view taken along line 6—6 of FIG. 1 and particularly illustrates the tassel severing device of the present invention.

The tassel severing apparatus of the present invention is shown in detail in FIGS. 6 and 7. The flexible drive belts 49 and 88 are each mounted for rotation about a plurality of pulleys of which main drive pulleys 115 and 116 and secondary pulleys 118 and 119 for the belts 88 and 49 respectively, are visible in FIG. 6. All of the pulleys for the drive belts 49 and 88 are depended from the underside of bottom plates 122 and 123 of the support box 39.

The drive pulleys 115 and 116 are connected to respective drive shafts 126 and 127 which are driven at a selected speed from the hydraulic motor 51 through respective spur gears 128 and 129. The belts 49 and 88 are driven in opposite directions, as indicated by the arrows, to draw the tassel 112 upwardly along the inclined plane of the belts to sever the tassel from the stalk 110.

Further details of the construction of the severing means are provided in FIG. 7. The guide pulleys at the right side of the drawing, that is, near the entrance of the severing mechanism, are positioned to establish a V-shaped entry path to thereby urge the plants toward the contiguous surfaces of the belts 49 and 88. To further aid in this regard, the cover plates 122 and 123 are cut away to follow this V-shaped entrance path. The belts 49 and 88 are rotated at like speed and the natural direction of movement of these belts tends to draw stalk between their contiguous surfaces. A series of pulleys 131a through 131d for belt 49 are interspaced with a series of like pulleys 132a through 132d for drive belt 88. The use of such interspaced pulleys has been found a very suitable means to maintain a substantially uniform and firm pressure between the contiguous surfaces of the drive belts 49 and 88. Thus, the tassels 112 are not able to slip from between the belts and avoid severence from the main portion of the stalk. The tassels upon reaching the rearward most portion of the contiguous belt segments are ejected therefrom and may either fall to the ground or be collected as desired.

The overall operation of the detasseling units and the vehicle 10 can be understood by brief reference again to FIG. 1. As the vehicle 10 enters a corn field, the heights of the two detasseling units are individually set by actuation of the lifting apparatus from control box 32. The relative orientation of the drums of each depressor unit and the severing unit are maintained constant for all heights. The distance separating each associated pair of depressor drums has been pre-set as is the spacing and orientation of the two guide bars for each drum pair.

The two leaf depressor drums of each pair are set to run at identical preselected rotational speeds which may be approximately one hundred and fifty revolutions per minute. The vehicle moves along the field at a speed of from approximately two and one half to four miles per hour and is, of course, steered to maintain an approximate alignment with the rows of corn. The corn plants successively enter the spaces between the leaf depressor drums and are progressively guided more closely to a precise center line of the drums by virtue of the progressively increasing diameter of each drum. This progressive taper of the drums, in conjunction with the modest inclination of the drums downwardly from their forwardmost points, assures that the topmost leaves of each plant are initially parted at their tips and then moved progressively downward while the applied force progressively moves inwardly on the leaves and downwardly against lower leaves to thereby effect a reliable and non-destructive depression of all of the leaves from about the tassel.

The entrance of the severing mechanism is located immediately rearwardly of its associated depressor drums so that the leaves are still in a depressed condition and the tassel may be grasped between the contiguous surfaces of the belt from between the depressed leaves. The upward inclination of the belts of the severing means smoothly draws the tassel away from the plant and effects a severing of the tassel in a manner which does not materially injure other portions of the plant. The tassels are then discharged from the backside of each severing unit and fall to the ground.

While particular embodiments of the present invention have been shown and described, it is apparent that various changes and modifications may be made, and it is therefore intended in the following claims to cover all such modifications and changes as may fall within the true spirit and scope of this invention.

What is claimed is:

1. Apparatus for removing tassels from corn plants or the like, which apparatus is adapted for mounting on a support carriage for movement along rows of said corn plants, comprising: depressing means for non-destructively depressing the leaves of said corn plant about said tassel for exposing the root of said tassel; said depressing means comprising a pair of elongated, drum-like members rotationally mounted about individual, substantially parallel, central axes, said members being relatively positioned on said carriage for movement along opposite sides of a row of said corn plants and being rotatable in opposite directions to drive the leaves of said plants downwardly from between said members; a pair of adjustable guide arms extending forwardly of said drum-like members for directing said corn plants along a path between said drum-like members; severing means positioned rearwardly of said leaf depressing means for severing said tassel from between said non-destructively depressed leaves; said severing means comprising a pair of flexible belts each mounted for rotation about a plurality of pulleys, said belts being contiguous one to the other along a portion of their length and spaced from one another along the remaining portion of their length; said depressing means and said severing means being associated in such a manner that after severance of the tassel the depressed leaves are released from said apparatus in a nondestructed condition.

2. The combination according to claim 1 which the contiguous portions of said belts lie approximately along a line passing midway between said drum-like members of said leaf depressing means.

3. The combination according to claim 2 in which said contiguous segments of said flexible belts have a forward portion commencing immediately rearwardly of said drum-like members for receiving tassels of said corn plants from between the depressed leaves thereof and a remaining portion inclining upwardly from said forward portion for drawing said tassels upwardly and away from said corn plants to sever them therefrom.

4. The combination according to claim 3 in which said drum-like members incline downwardly for effecting a progressive peeling of the leaves of said corn plants downwardly and away from said tassels and for accommodating moderate variations in the height of individual corn plants in a row.

5. The combination according to claim 4 in which said guide members comprise a pair of rods supported rearwardly of said drum-like members and projecting forward and beneath said members in closely spaced relation on opposite sides of said center line between said drum-like members, said guide members being flared upwardly and laterally outwardly at their forward end to forceably direct said corn plants between said rotatably mounted members and further including means for adjusting the relative positioning of each of said guide members in both horizontal and vertical directions.

6. The combination according to claim 5 in which said drum-like members are provided with a non-uniform surface to promote friction between said drum-like members and said leaves of said corn plants.

7. The combination according to claim 6 in which said severing means includes a plurality of pulleys interspersed on opposite sides of said contiguous belt segments for maintaining said belts in firm engagement along said contiguous portions.

8. The combination according to claim 7 in which the forward portions of said drum-like members each are provided with a sharply conical taper to initially guide said corn plants into alignment with main body portions of said drum-like members.

9. The combination according to claim 8 in which said drum-like members each comprise a support frame having a wire mesh formed thereabout to define generally cylindrical main body portions.

10. The combination according to claim 9 in which barbs are provided on said main body portions for pricking said leaves to aid in forceably but non-destructively depressing said leaves downwardly and away from said tassels.

11. The combination according to claim 10 and further including a helical metal band wound about each of said drum-like members in a direction to create an auger-like motion in moving said corn plants from the forward to the rearward portions of said drum-like members.

12. The combination according to claim 11 and further including means for adjustably raising and lowering said depressing and severing means as an integral unit with respect to said carriage.

References Cited

UNITED STATES PATENTS

| | | | |
|---|---|---|---|
| 1,703,721 | 2/1929 | Butman | 56—56 |
| 2,163,849 | 6/1939 | Pfister | 56—51 XR |
| 2,368,895 | 2/1945 | Spiegl | 171—61 |
| 2,397,249 | 3/1946 | Dostal | 56—15 |
| 2,834,174 | 5/1958 | Suggs et al. | 56—27.5 |
| 2,958,174 | 11/1960 | Lawson | 56—15 |

ANTONIO F. GUIDA, Primary Examiner

U.S. Cl. X.R.

56—15, 1

PO-1050
(5/69)

UNITED STATES PATENT OFFICE
CERTIFICATE OF CORRECTION

Patent No. 3,524,308                    Dated August 18, 1970

Inventor(s) Robert H. Spry

It is certified that error appears in the above-identified patent and that said Letters Patent are hereby corrected as shown below:

IN THE SPECIFICATION:

Column 3, line 34, "time" should be --tire--.

IN THE CLAIMS:

Column 7, line 55, "continguous" should be --contiguous--.

Column 7, line 61, insert --in-- following "Claim 1".

SIGNED AND
SEALED
NOV 3 1970

(SEAL)
Attest:

Edward M. Fletcher, Jr.
Attesting Officer

WILLIAM E. SCHUYLER, JR.
Commissioner of Patents